United States Patent
Gerow et al.

[15] 3,658,564
[45] Apr. 25, 1972

[54] WATER-INSENSITIVE BONDED PERLITE STRUCTURES

[72] Inventors: Stephen A. Gerow, Glen Mills, Pa.; Verne Wesley Weidman, Wilmington, Del.

[73] Assignee: E. I. du Pont de Nemours and Company, Wilmington, Del.

[22] Filed: June 1, 1970

[21] Appl. No.: 42,556

[52] U.S. Cl. ..............................106/84, 106/40, 106/DIG. 2, 252/62
[51] Int. Cl. ....................................C04b 35/16, C04b 43/04
[58] Field of Search ...........................106/40, 75, 84, DIG. 2; 252/62

[56] References Cited

UNITED STATES PATENTS 2,583,292  1/1952  Bowen et al............................106/40 R Primary Examiner—James E. Poer
Attorney—Don M. Kerr

[57] ABSTRACT

Water-insensitive insulating structures of expanded perlite bonded by an in situ-produced water-insoluble crystalline reaction product of perlite and sodium or potassium silicate. Structures are obtained by mixing the perlite with an aqueous solution of the silicate to make a damp granular powder, compacting the powder into a coherent article, and curing the article under controlled temperature and humidity conditions so as to maintain a water level in the article of at least about 10 weight percent based on solids for a period of time sufficient to produce the crystalline binder. After curing, the structures are dried, if necessary, to a water content below about 20 percent, based on solids.

5 Claims, No Drawings

3,658,564

WATER-INSENSITIVE BONDED PERLITE STRUCTURES

BACKGROUND OF THE INVENTION

This invention relates to water-insensitive, bire-fringent, rigid, low density perlite-silicate structures and processes for their preparation.

Under the presently available methods of preparing acoustical and thermal insulating materials, alkaline ionic silicate binders have not proven satisfactory where such materials are subsequently exposed to humid conditions or come in contact with water. Alkaline ionic silicate bonded compositions are highly hygroscopic, causing them to warp, sag, and otherwise lose their structural and dimensional stability under such moist conditions unless a third ingredient is added to the composition to stabilize the silicate, or the composition is fired at elevated temperatures after molding, or both.

Limited success in improving the water insensitivity of silicate bound filler materials has been achieved by the addition of a third ingredient such as clay, U.S. Pat. No. 3,203,813, sodium chloride, U.S. Pat. No. 2,600,812, caustic, U.S. Pat. No. 3,445,253, alum, U.S. Pat. No. 2,705,198, or urea U.K. Pat. No. 1,059,832 (page 11, line 75 et seq.) to the composition.

The prior art also discloses the stabilization of similar compositions by firing with conventional thermal, U.S. Pat. No. 3,445,253, and microwave energy, Baker, J. E., *Silicate Foam for Airdrop Cushioning*, Clearinghouse for Federal Science and Technology Publications, U.S. Department of Commerce (May 1968).

We have surprisingly discovered a method for preparing water-insensitive, acoustical and insulating materials from fillers, having at least a 75 percent reactive expanded perlite content, and alkaline ionic silicates.

Apparently, the relative concentration of silica to alkali in such materials in critical as well as the extent of curing during their manufacture. Curing such materials after forming enables the perlite fraction of the filler to react with the silicate to produce a water-insoluble crystalline reaction product which is believed to render such cured article water-insensitive.

SUMMARY OF THE INVENTION

In summary, the water-insensitive, birefringent, rigid, low density structural products of this invention consist essentially of expanded perlite bonded by an in situ-produced water insoluble crystalline reaction product of perlite and sodium or potassium silicate and are made by the process comprising steps (a) to (c) in sequence:

a. mixing 1 to 2 parts filler materials, having at least 75 percent by weight reactive expanded perlite, with 4 to 1 parts of an aqueous solution of sodium silicate, having an $SiO_2:Na_2$ weight ratio of 3:1 to 4:1 and a solids content of 28 to 34 weight percent, or potassium silicate, having an $SiO_2:K_2O$ weight ratio of 2:1 to 2.6:1 and a solids content of 24 to 30 weight percent;

b. forming the mixture into a coherent article by compression; and c. curing the coherent article under controlled temperature and humidity conditions, whereby the water content of said article is maintained at a level of not less than about 10 percent of the weight of the water-free solids in said article, for a period sufficient to produce an article capable of withstanding 8 hours of immersion in boiling water.

DESCRIPTION OF THE INVENTION

Physical Properties of Product

The most surprising physical property of the bonded perlite-silicate products of this invention is the high degree of water-insensitivity such materials possess when compared to the bonded perlite-silicate products known in the art.

In order to quantitatively define this property and dramatize this distinction, a severe but effective "water test" was developed. In this test, the cured samples were cut into specimens having dimensions 3 inches × 3 inches × 1 inch thick. One or more specimens were reserved as controls, while an equal number of specimens was selected for water exposure.

All specimens were weighed and their dry densities were calculated. The specimens for water exposure were then suspended completely submerged in ~2,500 ml. of water. Heat was applied to the containers and the water temperature was gradually taken to the boiling point. The specimens were exposed to boiling water for an 8 hour period, after which the heat source was removed. The specimens were allowed to remain completely submerged in the same water for an additional 16 hours.

At the conclusion of the 24 hour immersion, the samples were removed and oven dried at a temperature of 165° F. overnight. During the following morning, the dried samples that had been exposed to water were again weighed and their dry densities determined. Weight loss in percent on an original dry basis was calculated.

Compressive strengths of all samples, both water exposed and the controls, were determined on an Instron Testing Machine. Values for compressive strength at 5 percent deformation in lb./sq.in. were obtained on all specimens. Comparisons were made on the basis of water-exposed vs. unexposed (control) specimens.

Water resistance is an extremely critical property of silicate-bonded systems. This test method provides an accurate means of measuring water resistance. In a water-sensitive system, the sample disintegrates soon after immersion in water, and usually before the temperature reaches the boiling point.

Examination of particles of the cured products of this invention under a petrographic microscope, having a polarized light source, reveals birefringent crystalline material randomly dispersed against an amorphous background. This crystalline material was found absent in water-sensitive silicate-perlite products which were not cured in accordance with the process of this invention.

The density of the products of this invention will vary depending upon the degree of compaction and the initial density of the mixture. Densities of the products of this invention should not exceed 30 lbs./cu.ft. and are preferably in the range of 8 to 14 lbs./cu.ft.

STARTING MATERIALS a. Fillers

The filler component of the products of this invention can comprise reactive expanded perlite by itself, or reactive expanded perlite and other inert fillers in admixture; the reactive expanded perlite comprising at least 75 percent of any such admixture.

1. Reactive Expanded Perlite

The perlites used in the process of this invention are expansible volcanic glasses, consisting essentially of silica, aluminum silicates in varying degrees of hydration, and small amounts of alkalis.

Perlite is expanded by heating this volcanic mineral to a temperature of 850°–1,200° C., depending upon the chemical composition of the mineral. The expanded perlite will have a density of about 2 to 8 lbs/cu.ft. as compared to about 140 lbs/cu.ft. for the unexpanded mineral.

The preferred perlite fillers used in the process of this invention can have a density of 2.5 to 3 lbs/cu.ft.

A chemical analysis of expanded perlite discloses the following:

| Oxide | | % by Weight[1] |
|---|---|---|
| Silicon Dioxide | ($SiO_2$) | 71.0–75.0 |
| Aluminum Oxide | ($Al_2O_3$) | 12.5–18.0 |
| Potassium Oxide | ($K_2O$) | 4.0–5.0 |
| Sodium Oxide | ($Na_2O$) | 2.9–4.0 |
| Calcium Oxide | (CaO) | 0.5–2.0 |
| Ferric Oxide | ($Fe_2O_3$) | 0.5–1.5 |
| Magnesium Oxide | (MgO) | 0.1–0.5 |
| Titanium Dioxide | ($TiO_2$) | 0.03–0.2 |

Traces of other elements, e.g., S, Ba, Cr, Pb, Ni

1. Perlite Institute

The physical properties of representative samples of expanded perlite are as follows:

| | |
|---|---|
| Color | White |
| Softening point | 1,600°–2,000°F. |
| Fusion point | 2,300°–2,450°F. |
| pH | 6.6 to 8.0 |
| Specific heat | 0.20 |
| Specific gravity | 2.2 to 2.4 |
| Refractive index | 1.5 |
| % Free moisture, maximum | 0.5 |
| Loose weight, pcf | As desired |
| Solubility | –Soluble in hot concentrated alkali and in hydrofluoric acid. |
| | –Slightly soluble (2%) in concentrated mineral acids |
| | –Very slightly soluble (0.1%) in dilute mineral or concentrated weak acids. |

Most, if not all of the perlites that are processed in this country have a common geographical point of origin and are therefore chemically similar.

The perlite used in the products of this invention is characterized as "reactive" in order to distinguish it from the inert filler materials that can also be present in the mix. Apparently, the perlite fraction of the filler reacts with the aqueous silicate to produce a water insoluble crystalline material which is believed to contribute to the water insensitivity of the ultimate article. This water insoluble crystalline material is randomly dispersed throughout what has generally been regarded as a vitreous, amorphous composition.

The reaction of significant amounts of perlite with aqueous silicate occurs during the curing step in the process of this invention. Past attempts at producing water-insensitive structural materials of the type produced by the process of this invention have proven unsuccessful because traditional processes have omitted a curing step between forming and drying.

2. Inert Fillers

Various inert, water insoluble fillers can be included in the filler materials used in the products of this invention. These inert materials can be present in the filler in a concentration of about 25 percent of the weight of the total filler component, and can be omitted completely without any effect on water-insensitivity.

The inert fillers which can be added to the filler component of the products of this invention can comprise particulate material, such as the clays, gypsum, wollastonite, fly ash, vermiculite, or pigmentary potassium titanate, and/or fibrous fillers, such as nylon, polypropylene, rayon, cellulosic materials, metal whiskers or mesh, alumino-silicate fibers, rockwool, slagwool, and the like.

Inert fillers of the type described above can be added to the products of this invention to provide structural reinforcement, e.g., mineral wools, or reduce the sound transmittance of an acoustical product, e.g., vermiculite.

b. Aqueous Alkaline Ionic Silicates

The aqueous silicate reactants used in the products of this invention are water soluble compounds which are substantially completely ionized in aqueous solution. The weight ratio of respective ions in solution is usually expressed in terms of the relative concentration of $SiO_2:M_2$ in aqueous solution, where M is Na or K.

For sodium silicate binders, the preferred weight ratio of $SiO_2:Na_2$ in aqueous solution ranges from 3:1 to 4:1. Weight ratios of $SiO_2:Na_2O$ below 3:1 do not produce water-insensitive structural material by the process of this invention, and weight ratios above 4:1 are economically unattractive.

The most preferred weight ratio of $SiO_2:Na_2O$ for the aqueous sodium silicate solutions used in the process of this invention is 3.25:1.

Structural materials made by the process of this invention in which sodium silicate is one of the reactants may undergo efflorescence in moist or humid environments, depending on the completeness of curing; however, this surface chalking of structural materials affects only their appearance, not their other physical properties.

For potassium silicate binders, the preferred weight ratio of $SiO_2:K_2$ in aqueous solution ranges from 2:1 to 2.6:1.

Structural materials made by the process of this invention in which potassium silicate is used as the binder do not undergo efflorescence and are therefore preferred for the manufacture of articles such as acoustical ceiling tile, where esthetic appearance is important.

The silicate portion of the products of this invention can comprise a mixture of both sodium and potassium silicates.

The solids content of the sodium silicate solutions used in the products of this invention must range from 28 to 34 percent, and the solids content of the potassium silicate solutions must range from 24 to 30 percent. Silicate solutions having a solids content below this minimal level do not produce structures of the requisite degree of water-insensitivity, while solutions having concentrations in excess of the upper limit yield products which crack.

The preferred solids content of a 3.25 weight ratio sodium silicate solution is approximately 31.6 percent.

MIXING

One to two parts filler materials are mixed with four to one parts aqueous silicate solution until uniformly dispersed among each other. The type of mixing equipment can vary depending upon the total volume of the mixture and the type of inert filler material present in the filler fraction of the mixture.

The preferred weight ratio of materials in the mixture is 2 parts filler to 1 part alkaline ionic silicate binder.

A Hobart Mixer with a wire ship beater proves satisfactory for smaller laboratory size batches, however, a kneader-type mixer is recommended for larger batches. Ribbon blenders also prove satisfactory for mixing these larger batches.

If the filler fraction of the starting materials contains a fibrous reinforcing filler, as for example mineral wool, experience has indicated that combining such materials in a pug-mill is preferred to the blenders and mixers previously described.

FORMING

After mixing, the starting materials appear as a damp granular powder which can be dry-pressed by standard ceramic processing techniques into a wide variety of shapes.

The minimum compaction pressure necessary to compress the granular material into a coherent shape appears to be approximately 25 lbs/sq.in. or slightly greater.

The mixture should not be compacted beyond a dry density of 30 lbs./cu.ft., and dry density in the range of 8 to 14 lb./cu.ft. is preferred.

The perlite component of the granular mass is readily compressible due to its expanded nature, however, compression of the granular mass under a pressure in excess of 250 lbs./sq.in. will invariably increase the density of the structural material beyond practical limits and collapses the expanded perlite, sharply reducing the chambered nature of the composition and adversely altering its acoustical properties. Compaction under high pressure may also displace the moisture along the particulate interface of the perlite granules, and thereby upset the interaction between the perlite and the aqueous silicate.

Compaction at pressures of 30 to 100 lbs./sq.in. is preferred for the process of this invention.

CURING

Once the damp granular powder is compressed into a coherent low density shape, the compacted mass must be cured in a controlled environment in order to maintain the water content of the composition at a level of at least 10 percent of the weight of the water-free solids of the composition.

Because water content is so critical in the curing step of the process, it is necessary to compress the damp granular powder within a short period after admixture, or take steps to minimize water loss prior to compaction.

The maintenance of a minimum water content in the compacted granular mass provides a reaction medium for the interaction of the reactive expanded perlite and the silicate. Firing or oven drying of the structural material immediately or shortly after compaction, ordinarily reduces the water content of the system below the critical level required, and therefore the reaction of these two materials is prematurely curtailed.

By maintaining the water content of the system at or above the minimum level required, the perlite and the silicate will react to form a water insoluble crystalline product which is believed to impart water insensitivity to the cured composition.

The rate and extent of formation of water insoluble crystalline material appears to be a function of water content, time and temperature.

Water content is critical to the rate at which the crystalline reaction product is formed only to the extent that it must not fall below about 10 percent of the weight of the water-free solids. Compacted structures having a water content in excess of this minimum level do not appear to have an accelerated rate of crystal formation, nor a greater overall amount of crystalline material, other conditions being equal.

Apparently the longer the compacted structural materials are allowed to cure, the greater the concentration of water insoluble crystalline binder formed. For example, if a sample is cured under ambient conditions, 50 percent relative humidity and 75° F., the minimum interval necessary to obtain adequately cured structures is 3 days. The longer the compacted composition is cured, the greater the compressive strength of the materials obtained, as shown in the following Table:

TABLE I

SODIUM SILICATE/PERLITE

EFFECT OF CURING

| Curing, Days[1] | Compressive Strength At 5% Deformation After Water Test, psi |
|---|---|
| 2 | 0 |
| 7 | 42 |
| 14 | 52 |
| 21 | 62 |
| 28 | 66 |

1. Ambient laboratory conditions, i.e., 75°F. and ~50% relative humidity.

The temperatures at which the compacted structural material is cured can range from approximately 50° to 400° F.

Curing at temperature of from about 275° to 400° F. is preferred for the process of this invention. Of course, when heat is applied to the compacted composition to accelerate curing, special precautions are necessary to insure that the water content of the article is maintained at the minimum level of 10 percent.

Evaporation of water from the structure can be controlled by adjustment of atmospheric pressure within the heating unit and/or by heating in the presence of steam.

Curing can also take place in excess of 400° F., however, even though technically possible, the special equipment, the superheated steam and other factors make such an operation commercially impractical.

Prior to curing, the compacted composition can be briefly treated with carbon dioxide vapor to enhance the early green strength of the article, however, treatment with carbon dioxide to cause setting of the silicate on the surface of article is not essential to the process of this invention.

Under normal atmospheric conditions, the carbon dioxide in the air will also react with the surface alkali of the green article.

DRYING

After curing, the product is dried, where necessary, to reduce its water content below 20% of the weight of its water-free solids.

Preferably, the product is dried even further, until its water content drops below 10 percent, thereby arresting the reaction between the perlite and silicate.

Drying is ordinarily accelerated by heating, preferably in the range of about 165°–220° F., until the water content is reduced to the desired level.

The structural materials produced by the process of this invention can be used to prepare articles having a variety of shapes and properties. The physical properties of the structures vary depending upon type of auxillary inert filler material also present in the filler fraction of the mix. Because of the unique qualities of the product produced by the process of this invention, it can be used in the manufacture of high temperature thermal insulation, non-combustible, water-insensitive acoustical ceiling tile, core materials for wall structures, steel ingot mold parts, and foundry risers.

The examples which follow provide some specific embodiments of the disclosure of this invention.

Parts and percentages in these examples are by weight unless otherwise stipulated.

EXAMPLE 1

A mixture consisting of 200 parts by weight of Du Pont's No. 9 Grade 3.25 $SiO_2/Na_2O$ ratio sodium silicate solution, (8.9 percent $Na_2O$, 29.0 percent $SiO_2$, 62.1 percent $H_2O$) of specific gravity 41.6° Be' at 60° F and having an approximate viscosity of 345 ± 85 cp. at 77° F., and 40 parts by weight of water is prepared, and this solution is blended in a Hobart Mixer kettle with 160 parts by weight of expanded perlite (ultra-fine grade, obtained from B & B Engineering, a subsidiary of American Machine and Foundry), having a density of about 2.5 lb./cu.ft. A specimen (dimensions 6 inches × 6 inches × 1 inch thick) is formed by pressing 210 g. of the above-described mixture at a pressure of ~100 psi. in a suitable mold. The specimen is cured by drying in air for 7 days at a temperature of 75° F. and a relative humidity of ~50 percent. Oven drying at a temperature of 165°–220° F. for 24 hours completes the curing operation.

A low-density, water-resistant, incombustible, rigid, siliceous structure is obtained, which is further characterized below. The property of resistance to water is determined by using the test method described hereinabove.

Properties:

| | Dry density, pcf. Before water exposure | After water test | Weight loss after boiling water test % | Crush strength at 5% deformation psi |
|---|---|---|---|---|
| (Control) | 13.7 | – | – | 129 |
| (Water) | 13.6 | 11.5 | 15.4 | 56 |

EXAMPLE 2

This example illustrates the failure of a product to develop water resistance when a ratio of $SiO_2/Na_2O$ less than 3:1 is used.

The procedure of Example 1 is repeated using 200 parts by weight of Du Pont's No. 14 Grade 2.87 $SiO_2/Na_2O$ ratio sodium silicate solution, (11.14 percent $Na_2O$, 32.04 percent $SiO_2$, 56.82 percent $H_2O$) of specific gravity 47.59° Be' at 60° F. and having an approximate viscosity of 1,250 ± 100 cp. at 77° F., as a replacement for No. 9 Grade Sodium Silicate.

A structure, similar to that produced in Example 1, is obtained, except that it is water sensitive, as shown below.

Properties:

| | Dry density, pcf. Before water exposure | After water test | Weight loss after boiling water test % | Crush strength at 5% deformation psi |
|---|---|---|---|---|
| (Control) | 14.9 | – | – | 131 |

(Water) 14.5 (Disintegrated in boiling water)

EXAMPLE 3

This example further illustrates the failure of a product to develop water resistance when a ratio of SiO2/Na2O less than 3:1 is used.

The procedure of Example 1 is repeated using 200 parts by weight of Du Pont's No. 16 Grade 2.38 SiO2/Na2O ratio sodium silicate solution, (13.9 percent Na2O, 33.1 percent SiO2, 53.0 percent H2O) of specific gravity 52.25° Be' at 60° F., as a replacement for No. 9 Grade sodium silicate.

Again, a structure, similar in appearance to that produced in Example 1, is obtained, except that, like the material of Example 2, it is water sensitive. Data are given below.

Properties:

| Dry density, pcf. | | Weight loss | Crush strength |
|---|---|---|---|
| Before water exposure | After water test | after boiling water test % | at 5% deformation psi |
| (Control) 15.1 | – | – | 133 |
| (Water) 14.7 | (Disintegrated in water) | | |

EXAMPLE 4

The procedure of Example 1 is repeated using 200 parts by weight of Du Pont's 2X Grade 3.54 SiO2/Na2O ratio sodium silicate solution, (6.55 percent Na2O, 23.2 percent SiO2, 70.25 percent H2O) of specific gravity 33.25° Be' at 78° F. and having an approximate density of 10.8 lb./gal. at 60° F., as a replacement for No. 9 Grade sodium silicate.

As in Example 1, a low-density, water resistant, incombustible, rigid, siliceous structure is obtained, which is further characterized below.

Properties:

| Dry density, pcf. | | Weight loss | Crush strength |
|---|---|---|---|
| Before water exposure | After water test | after boiling water test, % | at 5% deformation psi |
| (Control) 13.0 | – | – | 101 |
| (Water) 13.0 | 11.2 | 13.8 | 53 |

EXAMPLE 5

This example illustrates the influence of silicate concentration on the integrity of the molded samples when exposed to complete water immersion.

A formulation comprising 220 parts by weight of Du Pont's No. 9 Grade 3.25 SiO2/Na2O ratio sodium silicate solution (37.9 percent solids) is blended in a Hobart Mixer kettle with 160 parts by weight of expanded perlite of Example 1, having a density of about 2.5 lb./cu.ft. A specimen (dimensions 6 inches × 5 inches × 1 inch thick) is formed by pressing 210 g. of the above-described mixture at a pressure of ~100 psi. in a suitable mold. The specimen is cured by drying in air for 7 days at a temperature of 75° F. and a relative humidity of ~50 percent. Oven drying at a temperature of 165°–220° F. for 24 hours completes the curing operation.

A low-density, water-resistant, incombustible, rigid, siliceous structure is obtained, which is further characterized below. Except for the development of unsightly surface cracks, this sample resembles in appearance the structure obtained in Example 1. Again, the property of resistance to water was determined using the test method described hereinabove.

Properties:

| Dry density, pcf. | | Weight loss | Crush strength |
|---|---|---|---|
| Before water exposure | After water test | after boiling water test, % | at 5% deformation psi |
| (Control) 14.3 | – | – | 118 |
| (Water) 14.1 | 11.5 | 18.5 | 57 |

EXAMPLE 6

This example further illustrates the influence of silicate concentration on the integrity of the molded samples when exposed to complete water immersion.

The procedure of Example 5 is repeated using 200 parts by weight of Du Pont's 2X Grade 3.54 SiO2/Na2O ratio sodium silicate solution (29.75 percent solids) as a replacement for No. 9 Grade sodium silicate.

Again, as in Example 5, this high-silica ratio silicate solution produces a low-density, water-resistant, incombustible, rigid, siliceous structure, but surface cracks develop. This object is further described below.

Properties:

| Dry density, pcf. | | Weight loss | Crush strength |
|---|---|---|---|
| Before water exposure | After water test | after boiling water test, % | at 5% deformation psi |
| (Control) 14.9 | – | – | 84 |
| (Water) 14.1 | 12.0 | 14.6 | 60 |

Example 7

This example illustrates the negative results obtained when a SiO2/Na2O ratio less than 3:1 is employed.

The procedure of Example 5 is repeated using 220 parts by weight of Du Pont's No. 14 Grade 2.87 SiO2/Na2O ratio sodium silicate solution as a replacement for No. 9 Grade sodium silicate.

In this case, a structure is obtained similar in appearance to that produced in Example 5, but this product is water sensitive, as evidenced by the results presented below.

Properties:

| Dry density, pcf. | | Weight loss | Crush strength |
|---|---|---|---|
| Before water exposure | After water test | after boiling water test, % | at 5% deformation psi |
| (Control) 15.6 | – | – | 92 |
| (Water) 15.4 | (Disintegrated in boiling water) | | |

EXAMPLE 8

This example also illustrates the negative results obtained when a SiO2/Na2O ratio less than 3:1 is used.

The procedure of Example 5 is repeated using 220 parts by weight of Du Pont's No. 16 Grade 2.38 SiO2/Na2O ratio sodium silicate solution as a replacement for No. 9 Grade sodium silicate.

Similar to the results reported for Example 7, the structure is water-sensitive and rapidly disintegrates on immersion in water as shown below.

Properties:

| Dry density, pcf. | | Weight loss | Crush strength |
|---|---|---|---|
| Before water exposure | After water test | after boiling water test, % | at 5% deformation psi |
| (Control) 15.9 | – | – | 89 |
| (Water) 16.5 | (Disintegrated in boiling water) | | – |

EXAMPLE 9

A mixture consisting of 200 parts by weight of Du Pont's No. 14 Grade 2.87 SiO2/Na2O ratio sodium silicate solution and 74 parts by weight of water is blended in a Hobart Mixer kettle with 160 parts by weight of expanded perlite having a dry density of about 2.5 lb/cu.ft. This degree of dilution of No. 14 Grade produces a silicate solution having a solids content of 31.6 percent by weight of sodium silicate, which is exactly the concentration of the solution used in Example 1, when 200 parts of No. 9 Grade sodium silicate are diluted with 40 parts by weight of water.

As in previous examples, a specimen (dimensions 6 inches × 6 inches × 1 inch thick) is formed by pressing 210 g. of the perlite/sodium silicate mixture at a pressure of ~100 psi. in a suitable mold. The specimen is again cured by drying in air for 7 days at a temperature of 75° F. and a relative humidity of ~50 percent. Oven drying at temperatures in the range of 165°–220° F. for 24 hours completes the curing operation.

A low-density, rigid structure is obtained which does not disintegrate in boiling water. However, the structure is more markedly affected by water exposure, as compared to other perlite/silicate systems which pass the water test, as evidenced by a higher percentage weight loss and lower compressive strength. Also, cracks develop on the surface of the shaped object. Further characterization data are given below.

Properties:

| | Dry density, pcf. | | Weight loss after boiling water test, % | Crush strength at 5% deformation psi |
|---|---|---|---|---|
| | Before water exposure | After water test | | |
| (Control) | 13.4 | – | – | ** |
| (Water) | 13.4 | 10.2 | 23.6 | 34 |

EXAMPLE 10

This example further illustrates the negative results obtained when a SiO2/Na2O ratio less than 3:1 is used.

A mixture consisting of 200 parts by weight of Du Pont's No. 16 Grade 2.38 SiO2/Na2O ratio sodium silicate solution and 98 parts by weight of water is blended in a Hobart Mixer kettle with 160 parts by weight of expanded perlite having a dry density of about 2.5 lb/cu.ft. This degree of dilution of No. 16 Grade produces a silicate solution having a solids content of 31.6 percent by weight of sodium silicate, which is exactly the concentration of the solution used in Example 1, when 200 parts of No. 9 Grade sodium silicate are diluted with 40 parts by weight of water.

A specimen is molded and cured as described in Examples 1–9 above.

Again a low-density, rigid structure is obtained, which in this case is water sensitive, as described below.

Properties:

| | Dry density, pcf. | | Weight loss after boiling water test, % | Crush strength at 5% deformation psi |
|---|---|---|---|---|
| | Before water exposure | After water test | | |
| (Control) | 13.2 | – | – | 101 |
| (Water) | 13.7 | (Disintegrated in boiling water) | | |

EXAMPLE 11

A mixture consisting of 200 parts by weight of Du Pont's No. 30 Grade 2.50 SiO2/K2O ratio Potassium Silicate Solution, (8.3% K2O, 20.8% SiO2, 70.9 percent H2O) of specific gravity 30.2° Be' at 60° F. and having an approximate density of 10.5 lb./gal., and 160 parts by weight of expanded perlite of Example 1 having a density of about 2.5 lb./cu.ft. are blended in a Hobart Mixer kettle using a wire ship beater. A specimen (dimensions 6 inches × 6 inches × 1 inch thick) is formed by pressing 210 g. of the mixture at a pressure of ~100 psi. in a suitable mold. The specimen is cured by drying in air for 7 days at a temperature of 75° F. and a relative humidity of ~50 percent. Oven drying at a temperature of 165°–220° F. for 24 hours completes the curing operation.

A low-density, incombustible, rigid, siliceous structure is obtained which is further characterized below.

Properties:

| | Dry density, pcf. | | Weight loss after boiling water test, % | Crush strength at 5% deformation psi |
|---|---|---|---|---|
| | Before water exposure | After water test | | |
| (Control) | 13.4 | – | – | 122 |
| (Water) | 13.1 | 11.9 | 16.5 | 49 |

Observation: Specimen held together during water exposure test, but several large surface cracks had developed.

EXAMPLE 12

This example shows the improvement obtainable in the compressive strength, particularly after the water exposure test, by using a blend of both sodium and potassium silicates as the blinder for expanded perlite.

Grade mixture consisting of (a) 100 parts by weight of Du Pont's No. 30 Grade 2.50 SiO2/K2O ratio Potassium Silicate Solution, (b) 100 parts by weight of Du Pont's No. 9 Grade 3.25 SiO2/Na2O ratio sodium silicate solution, (c) 40 parts by weight of water is prepared, and this solution is blended in a Hobart Mixer kettle with 160 parts by weight of expanded perlite having a density of about 2.5 lb/cu.ft. A specimen (dimensions 6 inches × 6 inches × 1 inch thick) is formed by pressing 210 g. of the above-described mixture at a pressure of ~100 psi. in a suitable mold. The specimen is cured by drying in air for 7 days at a temperature of 75° F. and a relative humidity of ~50 percent. Oven drying at a temperature of 165-220° F. for 24 hours completes the curing operation.

A low-density, water-resistant, incombustible, rigid structure is obtained which is characterized below.

Properties:

| | Dry density, pcf. | | Weight loss after boiling water test, % | Crush strength at 5% deformation psi |
|---|---|---|---|---|
| | Before water exposure | After water test | | |
| (Control) | 14.0 | – | – | 131 |
| (Water) | 14.0 | 11.8 | 15.5 | 83 |

EXAMPLE 13

This example illustrates the use of elevated temperatures to accelerate the rate of air curing of perlite/silicate compositions.

A mixture consisting of 200 parts by weight of Du Pont's No. 9 Grade 3.25 SiO2/Na2O ratio sodium silicate solution, (8.9 percent Na2O, 29.0 percent SiO2, 62.1 percent H2O) of specific gravity 41.6° Be' at 60° F. and having an approximate viscosity of 345±85 cp. at 77° F., and 40 parts by weight of water is prepared, and this solution is blended in a Hobart Mixer kettle with 160 parts by weight of expanded perlite of Example 1, having a density of about 2.5 lb./cu.ft. A specimen (dimensions 6 inches × 6 inches × 1 inch thick) is formed by pressing 210 g. of the above-described mixture at a pressure of 100 psi. in a suitable mold. The specimen is cured for 60 minutes in a convection tunnel through which air is passed at a temperature of 275° F. The products of combustion from an open gas flame, which is used to preheat the air, are associated with the curing air together with water vapor from live steam that is sparged into the air stream passing through the convection tunnel. The specimen is then cured by drying in air for about 24 hours at a temperature of 75° F. and a relative humidity of 50 percent.

A low density, water-resistant, incombustible, rigid, siliceous structure is obtained, which is further characterized below. The property of resistance to water is determined by using the test method described hereinabove.

Properties:

| | | After water test | Weight loss after boiling water test % | Crush strength at 5% deformation psi |
|---|---|---|---|---|
| Before water exposure | | | | |
| (Control) | 15.1 | – | – | 125 |
| (Water) | 15.1 | 11.8 | 28.6 | 50 |

EXAMPLE 14

This example illustrates the effect of a different ratio in the blend of both sodium and potassium silicates as the binder for expanded perlite.

A mixture consisting of (a) 50 parts by weight of Du Pont's No. 30 Grade 2.50 SiO2:K2O ratio Potassium Silicate Solution, (b) 150 parts by weight of Du Pont's No. 9 Grade 3.25 SiO$_2$-Na$_2$O ratio sodium silicate solution, (c) 40 parts by weight of water is prepared, and this solution is blended in a Hobart Mixer kettle with 160 parts by weight of expanded perlite having a density of about 2.5 lb./cu.ft. A specimen (dimensions 6 inches × 6 inches × 1 inch thick) is formed by pressing 210 g. of the above-described mixture at a pressure of 100 psi. in a suitable mold. The specimen is cured by drying in air for 7 days at a temperature of 75° F. and a relative humidity of 50 percent. Oven drying at a temperature of 165°–220° F. for 24 hours completes the curing operation.

A low-density, water-resistant, incombustible, rigid structure is obtained which is characterized below.

Properties:

| | Dry density, pcf. | | Weight Loss | Crush strength at 5% |
|---|---|---|---|---|
| | No water exposure | After water test | after boiling water test % | deformation psi |
| (Control) | 14.8 | – | – | 131 |
| (Water) | 14.5 | 11.5 | 20.3 | 66 |

What is claimed is:

1. A water-insensitive, structural material consisting essentially of reactive expanded perlite bonded by an in situ-produced water insoluble, crystalline reaction product of perlite and sodium or potassium silicate, and made by the process comprising steps (a) to (c) in sequence:
   a. mixing 1 to 2 parts filler materials, having at least 75 percent by weight reactive expanded perlite, with 4 to 1 parts of an aqueous solution of sodium silicate, having an SiO2:Na2 weight ratio of 3:1 to 4:1, and a solids content of 28 to 34 weight percent, or potassium silicate, having an SiO2:K2O weight ratio of 2:1 to 2.6:1 and a solids content of 24 to 30 weight percent;
   b. forming the mixture into a coherent article by compression; and
   c. curing the coherent article under controlled temperature and humidity conditions, whereby the water content of said article is maintained at a level of not less than about 10 percent of the weight of the water-free solids in said article, for a period sufficient to produce an article capable of withstanding 8 hours of immersion in boiling water.

2. The water-insensitive structural material made by the process comprising steps (a) to (c) of claim 1 wherein step (a) comprises:
   mixing 1 to 2 parts filler materials, having at least 75 percent by weight reactive expanded perlite, with 4 to 1 parts 31.6 weight percent aqueous solution of sodium silicate, having an SiO2:Na2O weight ratio of 3.25:1.

3. The water-insensitive structural material made by the process comprising steps (a) to (c) of claim 1 wherein step (a) comprises:
   mixing 2 parts filler materials, having at least 75 percent by weight reactive expanded perlite, with 1 part 31.6 weight percent aqueous solution of sodium silicate, having an SiO2:Na2 weight ratio of 3.25:1.

4. A water-insensitive, structural material consisting essentially of reactive expanded perlite bonded by an in situ-produced water insoluble crystalline reaction product of perlite and a solution of sodium and potassium silicate, and made by the process comprising steps (a) to (c) in sequence:
   a. mixing 1 to 2 parts filler materials, having at least 75 percent by weight reactive expanded perlite, with 4 to 1 parts of an aqueous solution of sodium silicate, having an SiO2:Na2 weight ratio of 3:1 to 4:1, and a solids content of 28 to 34 weight percent, and potassium silicate, having an SiO2:K2O weight ratio of 2:1 to 2.6:1 and a solids content of 24 to 30 weight percent;
   b. forming the mixture into a coherent article by compression; and
   c. curing the coherent article under controlled temperature and humidity conditions, whereby the water content of said article is maintained at a level of not less than about 10 percent of the weight of the water-free solids in said article, for a period sufficient to produce an article capable of withstanding 8 hours of immersion in boiling water.

5. A process for preparing water-insensitive structural materials having expanded perlite bonded by an in situ-produced water insoluble, crystalline reaction product of perlite and sodium or potassium silicate, said process comprising steps (a) to (c) in sequence:
   a. mixing 1 to 2 parts filler materials, having at least 75 percent by weight reactive expanded perlite, with 4 to 1 parts of an aqueous solution of sodium silicate, having an SiO2:Na2 weight ratio of 3:1 to 4:1, and a solids content of 28 to 34 weight percent, or potassium silicate, having an SiO2:K2O weight ratio of 2:1 to 2.6:1 and a solids content of 24 to 30 weight percent;
   b. forming the mixture into a coherent article by compression; and
   c. curing the coherent article under controlled temperature and humidity conditions, whereby the water content of said article is maintained at a level of not less than about 10 percent of the weight of the water-free solids in said article, for a period sufficient to produce an article capable of withstanding 8 hours of immersion in boiling water.

* * * * *